Feb. 6, 1968 D. A. GARRETT 3,367,437
TWIN-PIVOT ARTICULATING-FRAME WHEELED VEHICLE
Filed Aug. 20, 1965 2 Sheets-Sheet 1

DWIGHT A. GARRETT
INVENTOR.

BY

ATTORNEYS

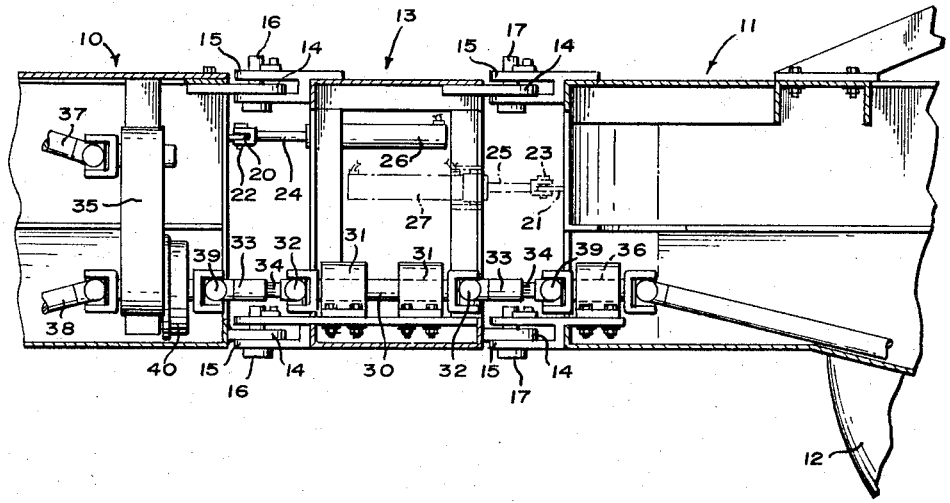
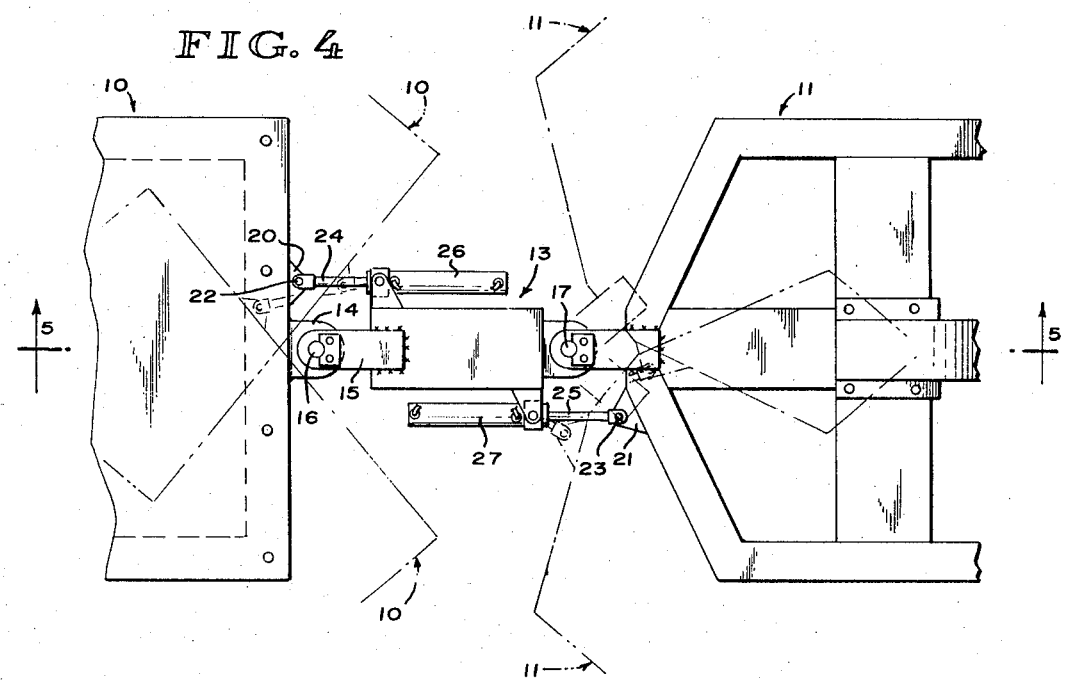

United States Patent Office 3,367,437
Patented Feb. 6, 1968

3,367,437
TWIN-PIVOT ARTICULATING-FRAME
WHEELED VEHICLE
Dwight A. Garrett, Enumclaw, Wash., assignor to Garrett
Enumclaw Co., a corporation of Washington
Filed Aug. 20, 1965, Ser. No. 481,202
8 Claims. (Cl. 180—51)

ABSTRACT OF THE DISCLOSURE

A three-section vehicle with each of two 2-wheeled end sections articulating with a center section and driving the ground wheels of both sections from an engine supported by the front end section, the drive to the front wheels comprising a downwardly inclined torque shaft leading from a transfer case supported by the front section, the drive to the rear wheels also leading from the transfer case and comprising four connecting torque shafts three of which are in-line and the fourth of which likewise inclines downwardly.

---

This invention relates to wheeled tractors, and particularly wheeled tractors of the general type illustrated and described in Letters Patent of the United States No. 3,049,186, issued Aug. 14, 1962, namely a tractor having a 2-wheeled front frame section and a 2-wheeled rear frame section each swively mounted so that steering of the vehicle is performed by causing one frame section to swing relative to the other frame section about a vertical axis. Prior vehicles of this articulating-frame character have had only a single pivot so that the frame sections swivelled about a vertical axis common to both sections.

It is the principal object of the present invention to devise an articulating-frame vehicle having superior operating characteristics, and this I accomplish by providing an assembly in which two 2-wheeled frame sections are complemented by a third and intervening frame section, and wherein this center section provides the connection between the wheeled sections, articulating with each by a respective one of two swivel joints located in each instance at the end of the center section proximal to the concerned wheeled section. The advantages achieved are improved traction, maneuverability, advanced weight distribution, and easier riding.

With the above object in view, the invention consists in the novel construction and in the adaptation and combination of parts hereinafter described and claimed.

In the accompanying drawings:

FIG. 4 is an enlarged-scale top plan view showing the center section and fragmentary portions of the two end sections; and FIG. 5 is a fragmentary longitudinal vertical sectional view on line 4—4 of FIG. 4.

Figure 1:
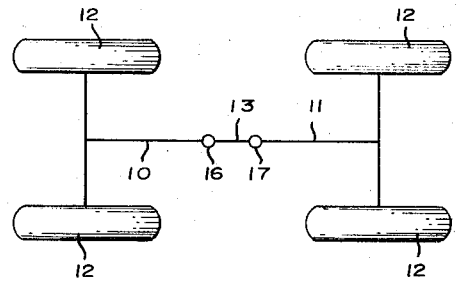
FIGURE 1 is a schematic top plan view of an articulating-frame vehicle embodying the twin pivots of the present invention, and with the frame sections being shown located in a straight-ahead steer position.
Figure 2:
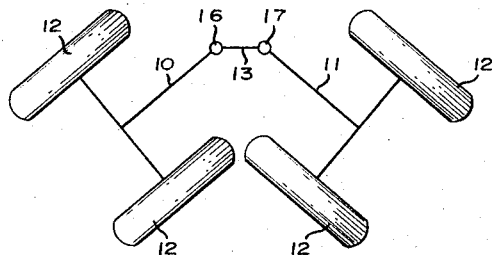
FIGS. 2 and 3 are schematic top plan views thereof illustrating the frame sections in the positions occupied for maximum turn and for maximum crab, respectively.

Referring to said drawings, front and rear 2-wheeled sections of the vehicle frame are denoted by the numerals 10 and 11, respectively. The vehicle preferably has its power plant, transmission, driver's station, and all vehicle controls supported upon the front frame section. The rear frame section is or may be surmounted by a high arch. Axles for the wheels 12 of both sections are live, and in the instance of one of the two sections the wheels turn about a transversely extending horizontal axis which is fixed in relation to the section. The wheels of the other section turn about a transverse horizontal axis which, desirably, is fixed in relation to a cradle which underlies the frame section, the frame section being mounted upon the cradle for rocking motion relative thereto about a horizontal axis lying on the longitudinal median line of the section I have not here shown the wheeled frame sections in detail but constructions which are suitable therefor are illustrated and described in my pending U.S. patent application Ser. No. 322,564, filed Nov. 8, 1963, now Patent No. 3,236,325.

According to the present invention there is provided a third frame section 13 which occupies an intervening position between the wheeled sections and articulates therewith. The two articulations occur on the longitudinal median line of the sections and are spaced longitudinally of the vehicle a substantial distance apart, being provided in each instance by two vertically spaced co-axial pivot assemblies. Each said pivot assembly provides a tongue 14 received between the arms of a fork 15, and has a traversing king pin. The king pins are denoted by 16 and 17 to distinguish the two articulations. The forks project longitudinally as rigid prolongations of one of the articulating sections and the tongues project longitudinally as rigid prolongations of the other articulating section. The two said pivot assemblies—namely upper and lower—for each articulation are rather widely spaced, with the lower assembly occupying a level which by preference is no lower than the horizontal plane in which the rotary axes of the vehicle wheels lie.

For steering purposes, the two wheeled sections each has a rigid arm, as 20 and 21, extending inwardly therefrom. Free ends of these arms lie to one side of the related articulating axis. Pivot pins 22 and 23 connect such free ends with the oppositely pointing end of a respective piston rod, as 24 and 25, having its piston working in a respective hydraulic cylinder, as 26 and 27, which is pivotally carried by the center frame section. The axes of said pins 22 and 23 and the axes about which the cylinders pivot parallel the axes of the king pins 16 and 17. The cylinders are double-acting and contained in a hydraulic system which includes the usual pump supplying fluid under pressure from a torage tank to suitable control valves located convenient to an operator occupying the driver's station The two cylinders are located by preference at opposite sides of the center section, offset vertically one from the other and from a longitudinally extending horizontal drive shaft 30 which passes power rearwardly through the center frame section from the vehicle's front-mounted power plant to the wheels of the rear frame section.

It will be seen from an inspection of FIGS. 4 and 5 that trunnion pins which provide wrist mountings for the hydraulic cylinders are located proximal to the front end. As the pistons which work in said cylinders are powered to the rear extreme of their permitted reciprocal travel, the responsive inward swing movement of the rear end of the related cylinder is accommodated by a through-opening which the configuration of the center frame section provides.

The drive shaft 30 receives a journal from bearings 31 for rotation about an axis occupying the longitudinal median line of the center frame section. Its length including universals 32 which are provided at each of the two ends is somewhat less than the longitudinal span between the king pins 16 and 17. The two universals each join the drive shaft to the inner end of a respective short torque shaft. These torque shafts are comprised of spline-connected telescoping sections 33 and 34, and each shaft extends a more or less equal and nominal distance fore and aft of the related axis of articulation of the vehicle. Components included in the vehicle's drive line connect by respective universals 39 with the outer ends of said torque shafts, one such component 40 comprising a brake drum fixed to the rearwardly pointing output shaft of a transfer case 35 and the other component 36 comprising one of two connecting shaft sections which lead to a differential for the live rear axle. In a manner which is or may be similar to that shown and described in my said Patent No. 3,236,325, the transfer case is driven by an input shaft 37 from the output end of an engine-driven speed-changing transmission and has a forwardly pointing output shaft 38 to drive a differential for the live front axle.

It will be seen from an inspection of FIG. 4 that the twin pivot articulating frame gives to the vehicle an unnusually short turning radius. This turning radius is, in fact, less than half that of a conventional single pivot articulating frame having the same clearance and wheel radius.

Figure 3:
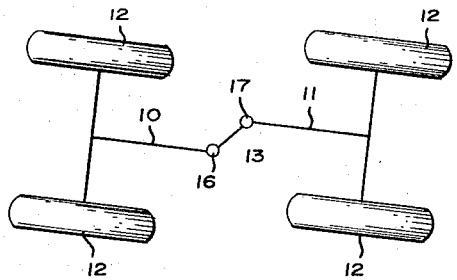
Figure 3:
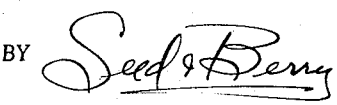

Further by comparison with a conventional single pivot articulating-frame vehicle, the present twin pivot arrangement permits the vehicle to have a long wheel base with short turning radius. This long wheel base is advantageous from several aspects. Among these advantages are an improvement of the riding qualities, better counter-weighting, improved stability and a better ability to back up a hill. The twin pivot arrangement also allows an operator to "duck-walk" the vehicle as a means of improving traction under adverse conditions. FIG. 3 illustrates the manner in which the vehicle lends itself to "crab-steering."

It is thought that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A vehicle comprising front and rear 2-wheeled sections separated by a center section and each articulating with the latter for relative swing motion about a respective one of two longitudinally spaced vertical axes, and power means for moving said 2-wheeled sections in said swing motion, a power plant and a speed-reduction mechanism being carried by one of the 2-wheeled sections and passing power through a respective drive line to the wheels both of said section which carries the power plant and the other 2-wheeled section, the drive line to the wheels of said latter section including three connecting shafts located approximately in-line and with the central one of said in-line shafts journaled from the center section for rotation about a horizontal axis traversed by the two axes of articulation and with the other two of said in-line shafts being each a telescoping shaft traversing a respective one of the two axes of articulation.

2. A vehicle according to claim 1 in which said axis of articulating for each of the 2-wheeled sections occupies the longitudinal median line of the concerned section.

3. A vehicle according to claim 1 in which said power means for moving the 2-wheeled sections comprises, for each said section, a respective double-acting hydraulic jack extending longitudinally of the vehicle in a position laterally offset from the articulating axis and having one end pivotally connected to the concerned 2-wheeled section and the other end pivotally connected to the center section.

4. A vehicle according to claim 3 in which the pivotal connection between the hydraulic jacks and the center section comprises trunnion pins, the center section having a transverse opening into which portions of the jacks are permitted to swing as said portions move toward the longitudinal median line of the center section by contraction of the jacks.

5. A vehicle according to claim 1 in which a respective one of two final torque shafts carries the drive to the two wheels of each 2-wheeled section, said two final torque shafts being each journaled from the related 2-wheeled section for rotation about a longitudinal axis which is inclined downwardly to approximately the level occupied by the rotary axes of the wheels from a considerably higher lever occupied by said three in-line shafts.

6. A vehicle according to claim 1 in which the articulation for each 2-wheeled section comprises a respective pair of vertically spaced co-axial pivot assemblies each comprised of a king pin traversing a fork and an interfitting tongue.

7. A vehicle comprising front and rear 2- wheeled sections, one a rocking section and the other a non-rocking section, each articulating with an intervening center section for swing motion about a respective one of two longitudinally spaced vertical axes located at the proximal end of the center section on the longitudinal median lines of the connecting sections, each of said two articulations comprising separated upper and lower pivot assemblies, each of said sections having a housed live axle for its two wheels, a main frame for each of said sections, an engine supported by one of the wheeled sections, a driving connection from said engine to the live axle of the engine-supporting section, a driving connection from said engine to the live axle of the other wheeled section, said last-named connection including an in-line set of three torque shafts, the central one of said torque shafts being journaled from the center section for rotation about a longitudinally extending horizontal axis located on a level between the levels occupied by said upper and lower pivot assemblies, the other two torque shafts being short with their span including a respective one of the two articulating axes and each having a universal at each of the two ends, and power means for moving said front and rear sections in their swing motion, said power means comprising, for each section, a respective double-acting hydraulic jack extending longitudinally of the vehicle in a position laterally offset from the axis about which the related section swings and having one end pivotally connected to the related section and the other end pivotally connected to the center section.

8. A vehicle according to claim 7, the hydraulic jacks each including a respective cylinder and a respective piston working in the cylinder, the pivotal connection between each hydraulic jack and the center section comprising trunnion pins provided upon the inner end of the concerned cylinder, the center section having a transverse opening into which the outer ends of said cylinders are permitted to swing as the outer ends move toward the longitudinal median line of the center section by contraction of the jacks.

References Cited

UNITED STATES PATENTS

| 2,883,774 | 4/1959 | Clifford | 180—50 |
| 3,236,325 | 2/1966 | Garrett | 180—50 |
| 3,305,039 | 2/1967 | Molby | 180—51 |

A. HARRY LEVY, *Primary Examiner.*